(12) United States Patent
Chase et al.

(10) Patent No.: US 6,428,592 B1
(45) Date of Patent: Aug. 6, 2002

(54) FURNACE WITH A PANEL AND FILTER ASSEMBLY

(75) Inventors: Thomas D. Chase, Derby; James J. Hopper, II, Wichita, both of KS (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 09/808,356

(22) Filed: Mar. 15, 2001

(51) Int. Cl.[7] .............................................. B01D 35/30
(52) U.S. Cl. ............................. 55/481; 55/483; 55/506; 55/511
(58) Field of Search ................................ 55/385.2, 480, 55/481, 483, 490, 495, 501, 511, 506, DIG. 31, 422, 500, 509, 504, 505; 126/99 R; 210/236

(56) References Cited

U.S. PATENT DOCUMENTS

| | | | |
|---|---|---|---|
| 2,050,605 A | * 8/1936 | Gordon et al. | |
| 3,142,550 A | * 7/1964 | Kuehne | |
| 3,823,533 A | * 7/1974 | Alverson et al. | 55/481 |
| 4,334,899 A | * 6/1982 | McConnell | 55/501 |
| 4,340,402 A | 7/1982 | Catron | 55/487 |
| 4,415,019 A | 11/1983 | Hunzicker | |
| 4,518,402 A | 5/1985 | Dargel | 55/485 |
| 4,701,196 A | 10/1987 | Delany | 55/481 |
| 4,919,123 A | 4/1990 | Jackson et al. | |
| 5,176,570 A | 1/1993 | Liedl | 55/502 |
| 5,399,180 A | 3/1995 | Kopp | 55/493 |
| 5,458,667 A | * 10/1995 | Poggi, Jr. et al. | 55/480 |
| 5,476,526 A | 12/1995 | Attermeyer | 55/496 |
| 5,525,145 A | 6/1996 | Hodge | 55/495 |
| 5,571,300 A | * 11/1996 | Stemmer | 55/493 |
| 5,679,121 A | * 10/1997 | Kim | 55/481 |
| 5,690,719 A | 11/1997 | Hodge | 55/486 |
| 5,863,310 A | * 1/1999 | Brown et al. | 55/480 |
| 5,935,282 A | * 8/1999 | Lin | 55/495 |
| 6,007,596 A | 12/1999 | Rosen | 55/491 |
| 6,030,427 A | 2/2000 | Sorice et al. | 55/480 |
| 6,059,852 A | 5/2000 | Olson | 55/495 |
| 6,126,707 A | 10/2000 | Pitzen | 55/495 |
| 6,126,708 A | 10/2000 | Mack et al. | 55/502 |

* cited by examiner

Primary Examiner—David A. Simmons
Assistant Examiner—Frank M. Lawrence
(74) Attorney, Agent, or Firm—McNees Wallace & Nurick LLC; Brian T. Sattizahn; Carmen Santa Maria

(57) ABSTRACT

The invention is directed towards a furnace comprising a panel and filter assembly. At least two z-shaped brackets and two flanges are used to retain a filter directly behind the front panel of the furnace. This allows for easy removal and installation of filters in the furnace. It further allows for the use of commercially available disposable filters.

7 Claims, 2 Drawing Sheets

FURNACE WITH A PANEL AND FILTER ASSEMBLY

DESCRIPTION OF THE INVENTION

Background of the Invention

The present invention relates generally to a furnace for use in a manufactured home. In particular, the present invention relates to a panel and filter assembly for such furnaces.

In site-built residential homes, the furnace typically delivers conditioned air to the home by means of ductwork contained within the walls, floor, basement, and/or attic of the home. The air returns to the furnace by means of a return air ductwork. The furnace then conditions the air and delivers it back to the home. In these systems air filtration generally occurs at some point in the return air ductwork.

In contrast, manufactured homes typically do not contain return air ductwork. Instead, the air returns to the furnace by means of the interior of the home. Typically, the furnace is installed in a closet or utility room in such a way that the front panel of the furnace is exposed. This front panel usually contains a plurality of louvers. The return air enters the furnace through these louvers. The furnace conditions the air and then delivers it back to the home.

Generally, these furnaces contain filters located behind this louvered front panel. Typically, these furnaces use clips, brackets, or wire retainers to hold the filters in place behind the front panel. These fasteners often make it difficult for the homeowner to replace the filters. The homeowner must remove the clips, brackets or retainers, remove the old filter, insert a new filter. and then reinstall the clips, brackets, or retainers. This requires a certain amount of mechanical ability. As a result, many homeowners either never replace their filters or remove their filters and never install new ones. This results in diminished furnace performance. It also results in the circulation of dirtier air throughout the home.

In addition, many manufactured home furnaces use permanent filters as opposed to disposable air filters. Often, commonly available disposal filters will not fit the space behind the front panel of the furnace. Permanent filters have many drawbacks. First, replacements are difficult to find because usually they are specially made to fit the furnace. Second, they require the homeowner to remove and clean the filter. As already stated, removing the filter alone can be problematic. In practice, very few homeowners clean these filters. In many cases after removing the filter, the homeowner either never replaces the filter or replaces it with a filter that does not fit. In either case this results in both reduced performance and cleanliness.

SUMMARY OF THE INVENTION

The present invention is a panel and filter assembly for a manufactured home furnace. It includes at least one filter, a panel, a top and bottom flange on the panel, and at least two brackets. The top and bottom flanges are sized to provide a support to hold the filter vertically in position when the filter is installed. At least one bracket is fixed to each respective side of the panel. Each bracket has a generally z-shaped configuration such that the bracket prevents the filter from moving outwardly away from the panel or horizontally when the filter is installed. The brackets and flanges cooperate to retain at least one filter behind said panel and are spaced such that the filter can be readily installed or removed without adjusting the brackets or flanges.

In another embodiment, the panel and filter assembly includes a plurality of brackets on one side of the panel and a plurality of brackets on the opposite side of the panel.

In a further embodiment, the panel and filter assembly includes a single elongated bracket on each respective side of the panel. The brackets are spaced from the flanges to permit the filter to be bent slightly and inserted or removed from the panel.

In another embodiment, the panel and filter assembly includes at least two filters, at least two panels, a top and bottom flange on each panel, and at least two brackets on each panel. The top and bottom flange on each panel are sized to provide a support to hold one filter vertically in position behind each panel, when the filter is installed. At least one bracket is fixed to each respective side of each panel. Each bracket has a generally z-shaped configuration such that the bracket prevents the filters from moving outwardly away from the panel or horizontally when the filter is installed. The brackets and flanges cooperate to retain one filter behind each panel and being spaced such that the filter can be readily installed or removed without adjusting the brackets or flanges.

In a further embodiment, the front panel assembly comprises a single elongated bracket on each respective side of each panel, the brackets being spaced from the flanges to permit the filter to be bent slightly and inserted or removed from the panel.

In another embodiment, the front panel assembly comprises two panels and two filters. In a further embodiment, the panels are manufactured from an injection molding process.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
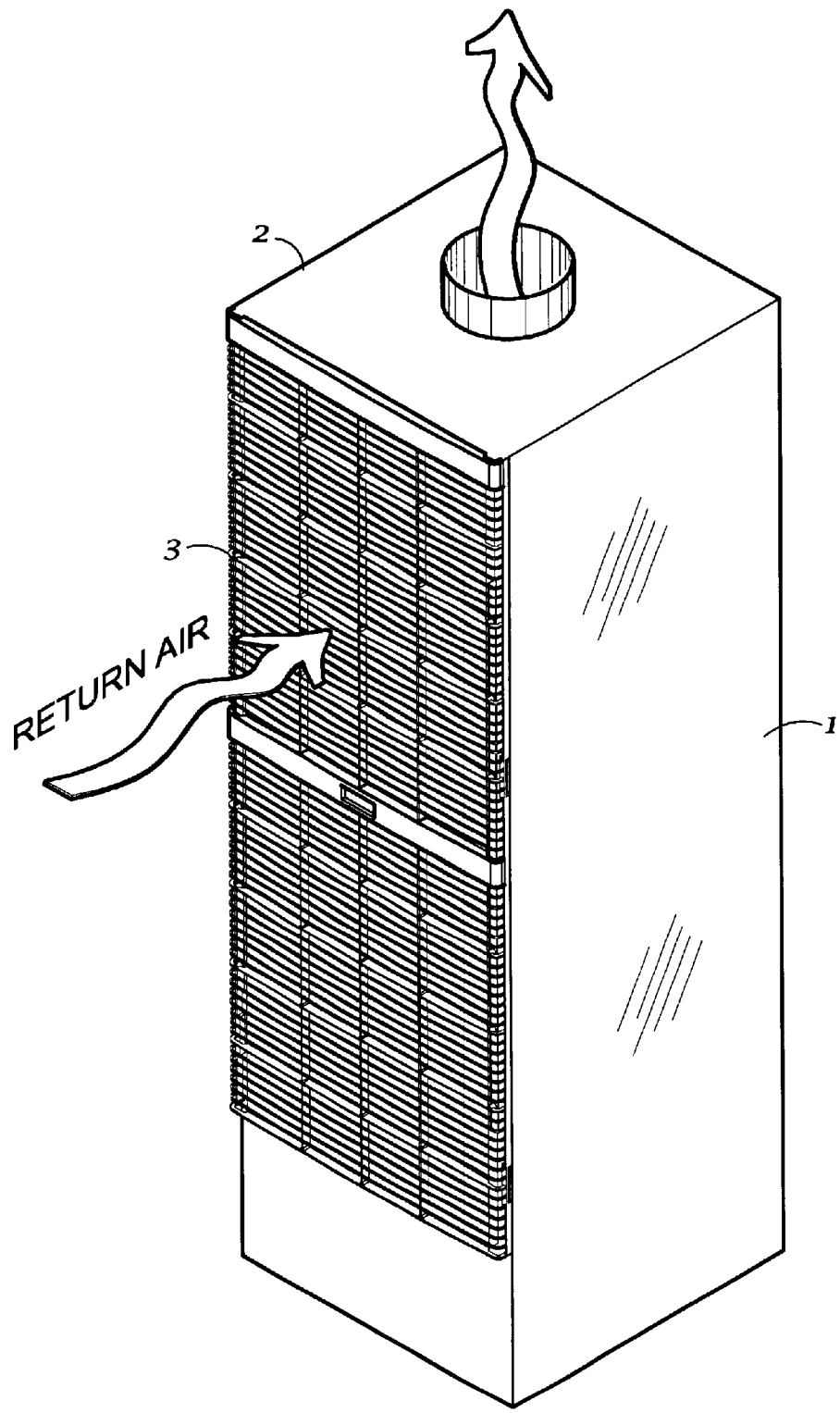
FIG. 1 is a perspective view of a furnace embodying the present invention.

FIG. 1 shows a furnace containing one embodiment of the present invention. The furnace 1 is of the type used in manufactured homes. The furnace 1 consists of a casing 2 with a partially open front. At its front, it includes a panel and filter assembly 3 with a filter system for delivering return air to the furnace. The furnace itself can be any one of a number of conventional furnaces used in a manufactured home, as well as future improvements of such furnaces. These furnaces require a front closure panel assembly to accept and filter return air.

When the furnace 1 is installed in a manufactured home, the installer places the furnace in a closet or utility room. The furnace is installed such that the front panel is exposed. During operation, the furnace delivers air to the home by means of ductwork. The air circulates through the home and returns to the furnace through the panel and filter assembly 3. The furnace then conditions the air and returns it to the home.

Figure 2:
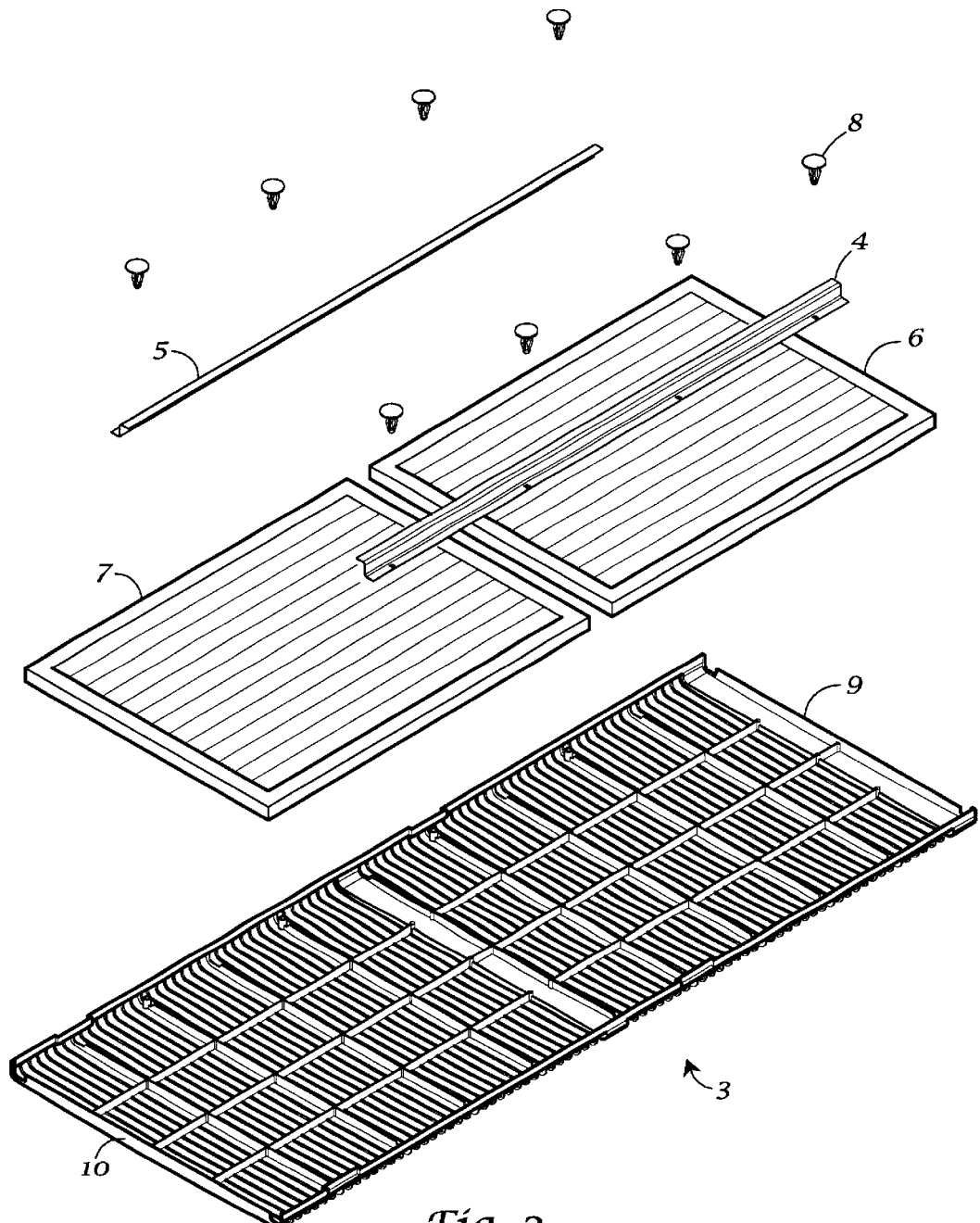
FIG. 2 is a perspective view of the rear face of the panel and filter assembly.

FIG. 2 is a perspective view of the rear face of one embodiment of the panel and filter assembly 3. In this embodiment the panel assembly consists of two panels. The panel assembly, however, can include one or more panels. In the preferred embodiment, two generally z-shaped metal brackets 4 & 5 are connected to the interior face of the panels. The brackets have a top flange, a generally parallel base, and a wall connecting the two. Preferably, the wall is perpendicular to the flange and the base.

In this embodiment, fasteners 8, such as push nuts, connect the brackets 4 & 5 to the molded panels. As shown, the push nuts press tightly over cylindrical embossments on the rear of the panel, thereby holding the rails in place. While this embodiment uses push nuts, other fasteners such as screws could also be used to connect the brackets to the panels.

The two brackets 4 & 5 in this embodiment, in combination with a top and bottom flange 9 and 10, cooperate to securely hold filters 6 & 7 in place directly behind each panel. The top flange of the bracket keeps the filter from moving outwardly away from the panel assembly 3 and the connecting wall of the bracket. The z-shape of the brackets 4 & 5 is closely fit to the dimensions of the filters 6 & 7 and prevents the filters 6 & 7 from sliding horizontally. The filters are prevented from sliding vertically by the flanges 9 and 10 located on both panels. As shown, in FIG. 2, the flanges 9 and 10 preferably do not extend outwardly from the panel as far as the flange on the brackets 4 & 5, thereby providing more space for inserting and removing a filter. As shown, the top and bottom of the brackets are spaced vertically from the flanges 9 and 10. Preferably, the brackets are spaced generally from 1/8 inch to 3/16 inch from the flanges 9 and 10. This spacing allows the filter to be easily installed and removed, while still holding the filter securely in place once it is installed. The filters are made of materials that allow the filter to be bent when it is installed and then return to its original position, whereby the filter is securely held in place.

In the illustrated embodiment, the brackets 4 & 5 are permanently fixed to the panel, when the panel is assembled. Therefore, a person removing or installing a panel does not have to loosen or release any aspect of the panel assembly to install or remove a filter. As a result, a person can easily install or remove the filters by bending the end of the filter slightly until it clears the flanges 9 and 10 and then sliding it in or out of the space enclosed by the bracket.

Although in the preferred embodiment continuous brackets 4 & 5 and flanges 9 and 10 hold the filter in place, other permanent brackets could be used as guides according to the principles of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A panel and filter assembly for a furnace comprising:

at least one filter;

a panel;

a top and bottom flange on the panel sized to provide a support to hold the filter vertically in position, when the filter is installed; and at least two brackets, at least one bracket fixed to each respective side of the panel, each bracket having a generally z-shaped configuration such that the bracket prevents the filter from moving outwardly away from the panel or horizontally when the filter is installed;

said brackets and flanges cooperating to retain at least one filter behind said panel and being spaced such that the filter can be readily installed or removed without adjusting the brackets or flanges.

2. The panel and filter assembly of claim 1, wherein the front panel assembly comprises a plurality of brackets on one side of the panel and a plurality of brackets on the opposite side of the panel.

3. The panel and filter assembly of claim 1, wherein the front panel assembly comprises a single elongated bracket on each respective side of the panel, the brackets being spaced from the flanges to permit the filter to be bent slightly and inserted or removed from the panel.

4. A panel and filter assembly for a furnace comprising:

at least two filters;

at least two panels;

a top and bottom flange on each panel sized to provide a support to hold one filter vertically in position behind each panel, when the filter is installed; and at least two brackets on each panel, at least one bracket fixed to each respective side of each panel, each bracket having a generally z-shaped configuration such that the bracket prevents the filters from moving outwardly away from the panel or horizontally when the filter is installed;

said brackets and flanges cooperating to retain one filter behind each panel and being spaced such that the filter can be readily installed or removed without adjusting the brackets or flanges.

5. The panel and filter assembly of claim 4, wherein the front panel assembly comprises a single elongated bracket on each respective side of each panel, the brackets being spaced from the flanges to permit the filter to be bent slightly and inserted or removed from the panel.

6. The panel and filter assembly of claim 5, wherein the front panel assembly comprises two panels and two filters.

7. The panel and filter assembly of claim 6, wherein the panels are manufactured from a molding process.

* * * * *